United States Patent [19]
Van Santbrink

[11] Patent Number: 5,321,395
[45] Date of Patent: Jun. 14, 1994

[54] SYSTEM PROVIDING VERIFIED INFORMATION EXCHANGE BETWEEN AN ELECTRONIC RECORD CARRIER AND A READ/WRITE UNIT

[75] Inventor: Ronald B. Van Santbrink, Rhenen, Netherlands

[73] Assignee: U.S. Philips Corporation, New York, N.Y.

[21] Appl. No.: 751,288

[22] Filed: Aug. 29, 1991

[30] Foreign Application Priority Data

Sep. 3, 1990 [NL] Netherlands .................. 9001930

[51] Int. Cl.⁵ .................. G06F 3/06; G06F 11/30; G06K 7/08
[52] U.S. Cl. .................. 340/825.31; 340/825.54; 235/380; 235/382; 235/382.5
[58] Field of Search ........... 235/375, 380, 382, 382.5, 235/449, 492, 488; 342/42, 44; 340/941, 825.31, 825.54, 825.32, 825.33, 825.34, 825.55

[56] References Cited

U.S. PATENT DOCUMENTS

| | | | |
|---|---|---|---|
| 4,353,064 | 10/1982 | Stamm | 235/380 |
| 4,605,844 | 8/1986 | Haggan | 235/380 |
| 4,677,657 | 6/1987 | Nagata et al. | 235/380 |
| 4,845,347 | 7/1989 | McCrindle et al. | 235/380 |
| 4,926,996 | 5/1990 | Eglise et al. | 340/825.35 |

Primary Examiner—Sandra L. O'Shea
Assistant Examiner—Mark H. Rinehart
Attorney, Agent, or Firm—Leroy Eason

[57] ABSTRACT

System for providing verified information exchange between a read/write unit (2) and an electronic record carrier (4) which stores the information as digital data in a memory (38). The exchange of data is controlled by a microprocessor (6) in or coupled to the read/write unit, which monitors whether the data to be stored in the memory (38) is being accurately stored therein. The information carrier includes a tuned circuit (34, 36) which is connected to an input/output (39) of the memory through a switching transistor (32). When a logic "high" value is present at its base, the transistor short-circuits the tuned circuit and so it no longer resonates. The tuned circuit is inductively coupled to a detector (14) in the read/write unit, which thereby detects the resonant or non-resonant condition and provides a corresponding logic signal to the microprocessor which compares such logic signal with the logic value of the data then being recorded. Any discrepancy is thereby detected. The system may be used in hotels for room access control, recording of the costs of use of hotel facilities, and for mail and/or message reporting.

10 Claims, 6 Drawing Sheets

| W/r | W/r | W/r | W/r | W/r | 0 | 0 | 1 |
|---|---|---|---|---|---|---|---|
| 8 | 7 | 6 | 5 | 4 | 3 | 2 | 1 |

SYSTEM PROVIDING VERIFIED INFORMATION EXCHANGE BETWEEN AN ELECTRONIC RECORD CARRIER AND A READ/WRITE UNIT

BACKGROUND OF THE INVENTION

1. Field of the Invention

The invention relates to a system for providing verified information exchange between an electronic information carrier and a read/write unit for reading and writing in the information carrier.

The invention likewise relates to an information carrier and a read/write unit to be used in such a system.

2. Description of the Related Art

Systems of this type may be used, for example, for access control n hotels, the information carrier serving as a key to a room and having a further possibility of containing additional information (for example, validity) which is to be read out by a read/write unit which is also capable of writing information on the carrier. This type of information may refer, for example, to use of hotel facilities for which a fee is to be paid, so that it may be used for computing the amount to be settled on departure.

The information exchange between the information carrier and the read/write unit could be realised by means of metal-to-metal contacts. However, this is undesirable because fouling or oxidation of metal-to-metal contacts may occur and these contacts may give rise to fraud.

Alternatively, it is possible to provide information exchange without metal-to-metal contacts. It may be by digital data transmission which is generally effected bit serially. It is then necessary to monitor whether there is any error in transmission of the data from the read/write unit to the information carrier. It is conceivable for monitoring of the data integrity to be carried out by performing a read cycle of the information carrier following each write cycle carrier, and in case a bit error is detected to repeat the write and read cycles. However, this manner of checking is time-consuming and may therefore lead to an undesirable interruption of the information exchange if, as is customary the information carrier is quickly inserted and removed from the read/write unit.

SUMMARY OF THE INVENTION

It is an object of the invention to provide a system for information exchange in which the integrity of the data can be monitored without an appreciable delay during the transmission to the information carrier.

For this purpose, the information exchange system according to be invention comprises:

a. a read/write unit which includes detection means for detecting whether the information carrier is present at a read/write location on the read/write unit;

b. first transmitting means for transmitting data from the read/write unit to the information carrier for storage therein, comprising a send section in the read/write unit and a receiving section in the information carrier; and c. second transmitting means for transmitting data from the information carrier to the read/write unit, comprising a send section in the information carrier and a receiving section in the read/write unit.

The information carrier includes a memory whose data input and data output are constituted by the same conductor (the input/output), which conductor is interconnected with both the output of the receiving section in the information carrier and the input of the send section in the information carrier.

The first transmitting means, for data transmission from the read/write unit to the information carrier, is separate from the second transmitting means. Consequently, it is possible during the writing cycle on the information carrier to produce a return message to the source of the data being written, such as, for example, a microprocessor. When a bit appears on the input/output of the memory during a writing cycle, the input of the send section likewise receives this same bit and so virtually immediately it is again detected in the receiving section of the read/write unit. If this detected bit deviates from the bit previously sent, the writing cycle can be stopped forthwith and started anew.

An embodiment of a system according to the invention is characterized in that an induction coil in the send section of the second transmitting means forms part of an absorption circuit that can be short-circuited.

When the absorption circuit is not short-circuited it resonates at the frequency of a receiving oscillator connected to the receiving coil of the read/write unit. Consequently, this oscillator loses energy, which loss is detected in the read/write unit. When the absorption circuit is short-circuited this loss of energy will not occur, and that is also detected. Thus, by intermittently short-circuiting the absorption circuit binary signals are transmitted from the information carrier to the read/write unit.

Another embodiment of a system according to the invention is characterized in that the read/write unit comprises a central unit which includes a microprocessor and a plurality of gates. The gates are respectfully connected to respective peripheral units at other respective read/write locations.

When such a system is used as an access system for a hotel room or a holiday park bungalow it is possible to place one peripheral unit outside the room and another peripheral unit inside the room. The outside unit may then be used for access to the room, whereas the inside unit may be used for recording the costs of use of facilities for which a fee is to be paid, such as a minibar, pay television or telephone. By means of the inside unit the hotel staff are now able at any moment, without disturbing the hotel guest, to check the condition of, for example, the minibar in the room and re-stock same on the basis of the findings.

Another embodiment of the system according to the invention is characterized in that, once the information carrier has been placed at the read/write location, the microprocessor compares a codeword stored in the read/write unit with a similar codeword stored in the information carrier. A match signal is generated if the two codewords match, and a new codeword based on the read out codeword is generated and thereafter stored in the information carrier and the read/write unit in lieu of the existing codewords.

These measures provide a safeguard against illegal copying of the information carrier. If the information carrier is used as a key to a hotel room it may be conceivable that this key is copied illegally, without the rightful owner of the key noticing this. Because the matching codewords are changed each time the room is accessed, the illegal copy will be rendered useless after the rightful owner has accessed the room only once. If the illegal key were inserted into the read/write unit prior to the rightful key, the rightful key holder will notice this immediately because he will then be barred from access to the room. In that case an alarm may be given forthwith.

A further embodiment of the system according to the invention is characterized in that the memory in the information carrier has a unique identification code and in the read/write unit comprises:

a. a first memory field;

b. an additional data input coupled to the first memory field, for receiving identification codes as well as an indication code belong to each identification code;

c. a second memory field for storing the identification code read out from the information carrier; and d. comparing the means for comparing identification codes in the first and second memory fields and if they match decoding the indication code associated therewith, the decoding including activating an indicator corresponding to the indication codes.

When using such a system in, for example, a hotel or a holiday park, the above measures may assist in presenting an indication of received mail and/or messages. In a hotel the unique identification code can be formed, for example, by the room number. If there is mail for the hotel guest in that room number, through the additional data input the hotel staff can feed to the read/write unit the room number identification code together with an indication code indicating what kind of message (letter, telefax, telephone, or report to the reception desk) is waiting for the hotel guest. That is stored in the first memory field of the read/write unit. When the hotel guest arrives back at the hotel, he inserts his information carrier into the read/write unit, after which the room number identification code in the information carrier is stored in the second memory field of the read/write unit. The microprocessor then compares it with that in the first memory field of the read/write unit. If they match and also for example, there is a message for this guest, an indicator (e.g. a small light) signifying the kind of message (e.g. "a fax message has arrived") will be activated. The hotel guest therefore need not wait at a busy reception desk, but sees on the read/write unit thus structured whether or not mail has arrived for him.

Yet another embodiment for the system according to the invention is characterized in that the read/write unit comprises means for automatically generating different groups of speech signals, and means for selecting one of the groups of speech signal in response to a type of information detected in the information carrier.

The different groups of speech signals may be formed each by a text in a certain language. In the information carrier it may be indicated which language is used by the hotel guest. Once a hotel guest has inserted the information carrier into the read/write unit, he can get instructions for the use of the facilities in the hotel room in his native language when the code for that language is detected by the read/write unit.

BRIEF DESCRIPTION OF THE DRAWINGS

The invention will now be described with reference to the following drawing FIGURES, in which.

DESCRIPTION OF THE PREFERRED EMBODIMENTS

Figure 1:
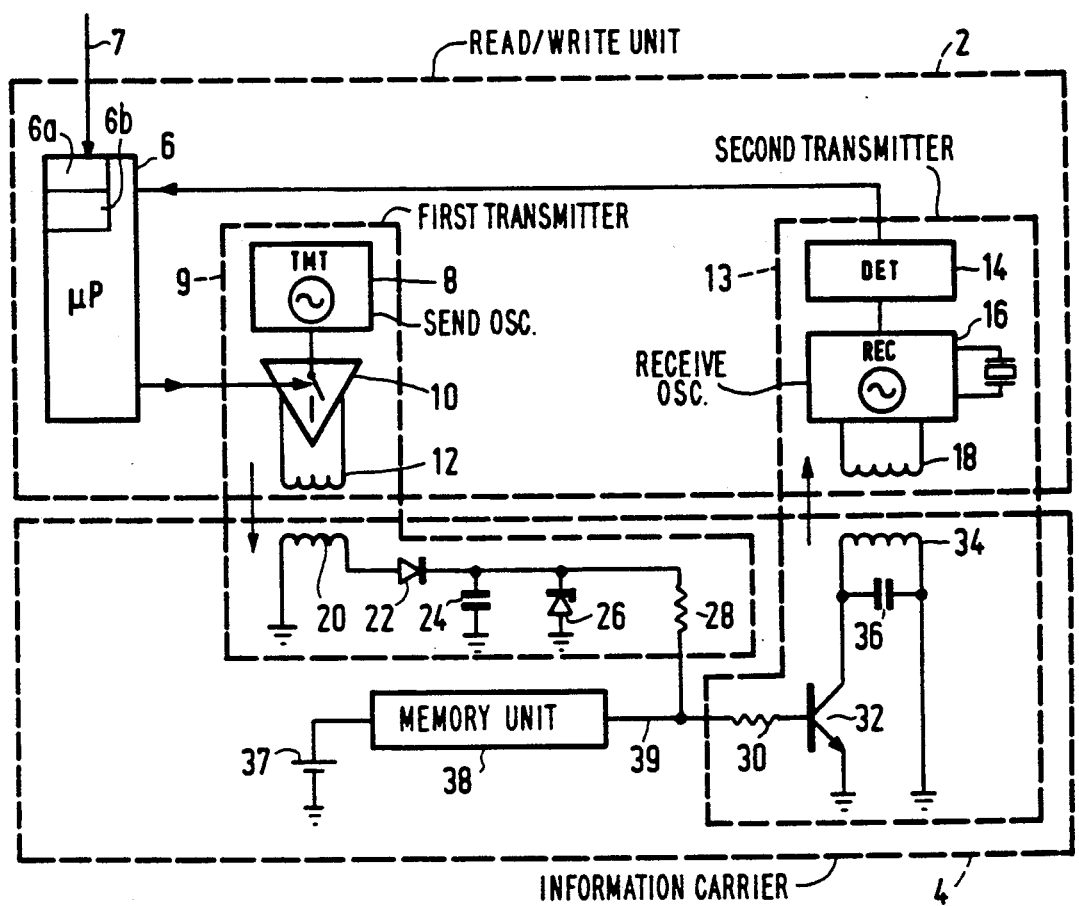
FIG. 1 shows a circuit diagram of the system including an electronic information carrier and a read/write unit.

FIG. 1 shows a combination of an electronic information carrier 4 and a read/write unit 2. This combination comprises first transmitting means 9 for transmitting data from the read/write unit 2 to the information carrier 4, and second transmitting means 13 for transmitting data from the information carrier 4 to the read/write unit 2. Inside the read/write unit 2 the transmitting means 9 comprise a send oscillator 8 whose output is connected to the input of a send amplifier 10. A send coil 12 is connected to the output of the send amplifier 10. The send amplifier 10 can be switched on and off by a data signal produced by a microprocessor 6 at a data output of the microprocessor. The portion of the second transmitting means 13 which is inside the read/write unit 2 comprises a receive oscillator 16 whose input is connected to a receive coil 18. An output of the receive oscillator 16 is connected to a detector 14 for detecting amplitude variation of the receive oscillator 16. The output of detector 14 is connected to a data input of microprocessor 6. The microprocessor also has an auxiliary data input 7.

Microprocessor 6 is of a customary type, for example, Philips 80 C 51; it may comprise a conventional program memory, for example, EPROM Signetics 27 C 256, and a conventional RAM memory, for example, a 256 kbit SRAM Toshiba TC 55257 APL-12.

The section of the first transmitting means 9 included in the information carrier 4 comprises a receive coil 20, a diode 22, a capacitor 24, a zener diode 26 and a resistor 28. One side of the receive coil is connected to the anode of diode 22. The cathode of diode 22 is connected to one side of capacitor 24, to the cathode of zener diode 26 and to one side of resistor 28. The other side of resistor 28 forms the output of the receiving section of the first transmitting means, which receiving section is inside the information carrier. This output is connected to the input/output 39 of memory circuit 38, which is fed by a small battery 37. The input/output 39 is also connected to the input of the send section of the second transmitting means 13, which send section is inside the information carrier. The sides of coil 20, capacitor 24 and zener diode 26 that have not been mentioned are connected to a common reference voltage ("ground"). The send section of the second transmitting means 13 comprises a parallel circuit formed by a coil 34 and a capacitor 36. One side of this parallel circuit is connected to ground, the other side also being connected to ground through the main current path of a transistor 32. One side of a resistor 30 is connected to the base of transistor 32, the other side thereof being the input of the send section of the second transmitting means 13.

The exchange of information between information carrier 4 and read/write unit 2 takes place as follows. As long as the read/write unit 2 does not detect the presence of an information carrier, the data output of microprocessor 6 keeps amplifier 10 off and so send coil 12 of the read/write unit 2 does not radiate energy. Consequently the electronic circuit of information carrier 4 is not supplied with energy and all the points in this circuit are at quiescent potential. This means that the base of transistor 32 has the same potential as the emitter and so the transistor is in a non-conductive state. If the information carrier 4 is now placed at the read/write location of the read/write unit 2, an inductive coupling will be produced between the receive coil 18 and send coil 34. The parallel circuit of send coil 34 and capacitor 36 forms an energy absorption circuit resonant at the frequency of the receive oscillator 16 (for example, 7 MHz). As a result of the inductive coupling between the coils 18 and 34, energy is absorbed from receive oscillator 16 and so the amplitude of the signal from this oscillator will drop. This drop is detected by detector 14, which supplies a detection signal to the data input of a microprocessor 6. In this manner the presence of information carrier 4 at the read/write location is detected by microprocessor 6.

Figure 1A:
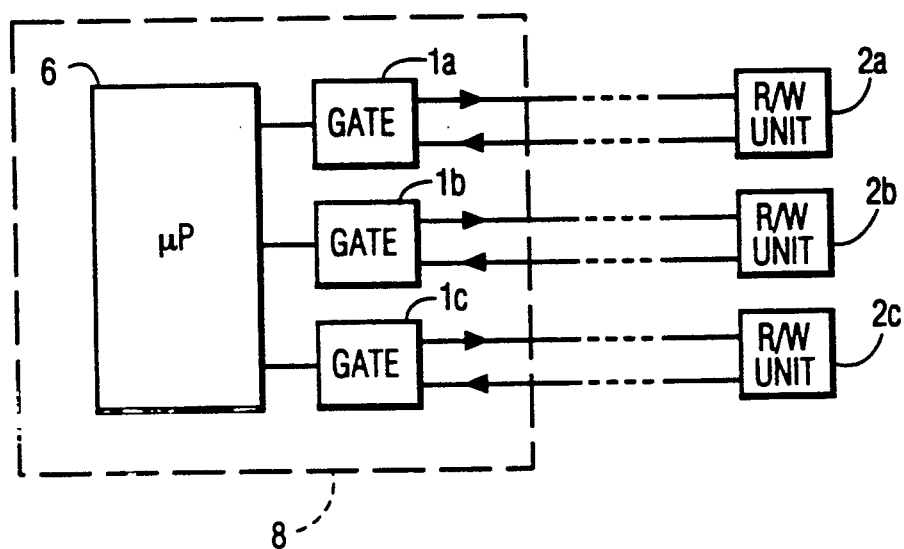
FIG. 1a is a circuit diagram of a possible modification of FIG. 1 in accordance with another embodiment of the system.

FIG. 1a shows a modification of FIG. 1 to arrive at the above-mentioned embodiment having a plurality of peripheral units and a central unit, the peripheral units being at different locations, each being a read/write unit as in FIG. 1 except that all share a common microprocessor located at the central unit. In FIG. 1a, the central unit 8 includes the microprocessor 6 having a plurality of gates 1a, 1b, 1c connected thereto. Each gate is connected by a pair of conductors (for two-way transmission) to a respective one of peripheral units 2a, 2b, 2c. Each peripheral unit is the same as read/write unit 2 in FIG. 1 except that the microprocessor is in the remote central unit. The gates enable selection of which peripheral units are connected through to the central unit at any time, and the direction of transmission.

Data transfer can now be effected controlled by the microprocessor 6. For this purpose, its data output now turns on send amplifier 10 so that send oscillator 8 (having a send frequency of e.g. 3 MHz) is thereby connected to send coil 12. This causes a voltage to be induced in receive coil 20, so that capacitor 24 is charged by diode 22. The voltage across capacitor 24 is stabilized by zener diode 26. The voltage at the junction between the cathode of zener diode 26 and resistor 28 now has the logic value "high". Resistor 28 has been included in order to enable the junction between resistor 28 and zener diode 26 to assume the logic value "high", even though the input/output 39 of memory 38 may have the logic value "low". It is assumed that input/output 39 does not affect the voltage on the junction between the resistors 28 and 30. The rise in such voltage causes the voltage at the base of transistor 32 to rise likewise, rendering the transistor 32 conductive and thus short-circuiting the parallel circuit of send coil 34 and capacitor 36. As a result, this parallel circuit is no longer resonant at the frequency of the receive oscillator 16 and so the amplitude of the oscillator signal increases. This situation is detected by detector 14, which sends a corresponding signal to microprocessor 6. In this manner the microprocessor can monitor whether the transmitted logic value has actually arrived at the input/output 39 of memory 38.

Figures 2, 3:
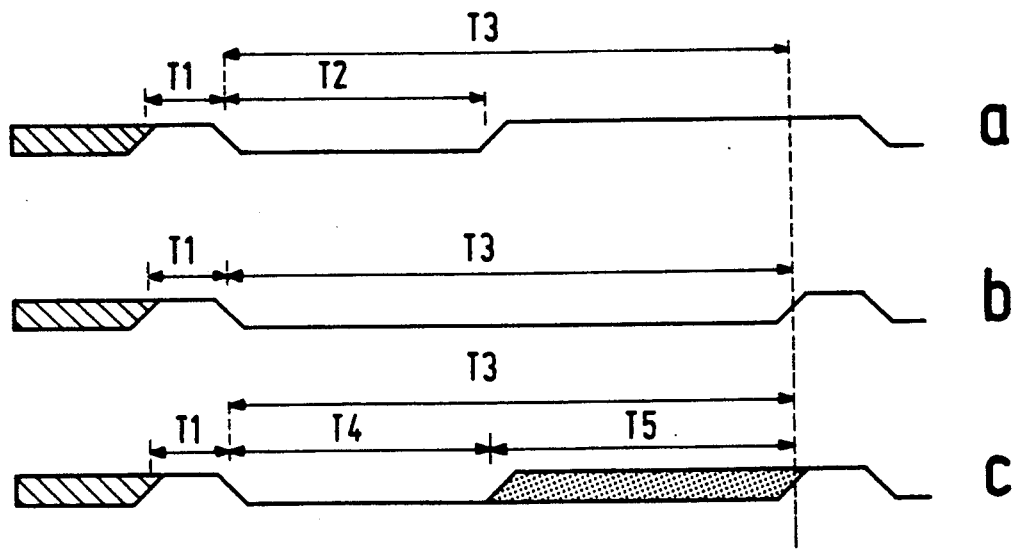
FIG. 2 shows a number of time diagrams of the different types of bits used for reading and writing in the memory of the information carrier.
FIG. 3 shows the structure of a command word preceding the reading or writing of data bits in the information carrier.

FIG. 2 shows three time diagrams illustrating the voltage variations at input/output 39 of memory 38. Each of the diagrams a, b and c shows the voltage variation in a time slot during which a bit can be written in or read-out from the memory 38. The time slot is formed by the sum of the time intervals T1 and T3. Diagram (a) shows the voltage variation necessary for writing a 1 bit value in the memory, diagram (b) shows the voltage variation necessary for writing a 0 bit value in the memory, and diagram (c) shows the voltage variation necessary for reading a bit from the memory. These voltage variations are necessary due to the specific structure of memory circuit 38, as will be further explained with reference to FIG. 4. For the memory to be writable, it must first be brought into the writing state and for the memory to be readable it must first be brought into the reading state. This is effected by means of a command word which will be further described with reference to FIG. 3. It is assumed that the memory has already been brought into the writing state.

A writing cycle is initiated by presenting a high-to-low transition on the input to the memory. The memory writes the logic value present at input/output 39 at an instant 35 $\mu$s after the high-to-low transition. Because a certain spread may occur in the above-mentioned value of 35 $\mu$s, the desired logic value should be present at the input/output no later than after 15 $\mu$s and be maintained for 60 $\mu$s. In diagram (a) T2 corresponds to 15 $\mu$s and T3 to 60 $\mu$s. From diagram (a) it appears that at the writing instant of 35 $\mu$s the logic value on the input/output is high so that diagram (a) represents the writing of a 1 bit value. From diagram (b) it appears that at the writing instant of 35 $\mu$s the logic value is low so that diagram (b) represents the writing of a 0 bit value.

In order to read a bit from the memory, the memory is first to be brought into the reading state. It is assumed that this is the case. The reading of a bit from the memory is commenced by a high-to-low transition of input/output 39. Because the memory is in the reading state, input/output 39 indicates the bit value of the memory location concerned during an interval ranging from 2 $\mu$s to 15 $\mu$s after the high-to-low transition (interval T4). After the interval T4, the indication of this bit value becomes uncertain.

Memory 38 is used in the following manner. In order to bring the memory into a known state, first 264 zeroes are written therein. (The voltage variation shown in diagram b is thus repeated 264 times on input/output 39 of memory 38). Any additional zeroes written therein are discarded by the memory. The memory can now be brought into either the writing or reading state by applying a defined command word to the memory.

FIG. 3 shows the structure of this command word. Each contains 8 bits, the three first being 1, 0 and 0 in that order. To bring the memory into the writing state, the subsequent five bits must all be 1's. In order to bring the memory into the reading state, one or more of these five bits must be 0. Once the memory has been brought into the reading state, it is possible to read 256 data bits from the memory by detecting 256 time slots. Once the memory has been brought into the writing state it is possible to write 256 data bits into the memory in 256 time slots, each time slot representing a 1 or 0 bit value.

Figure 4:
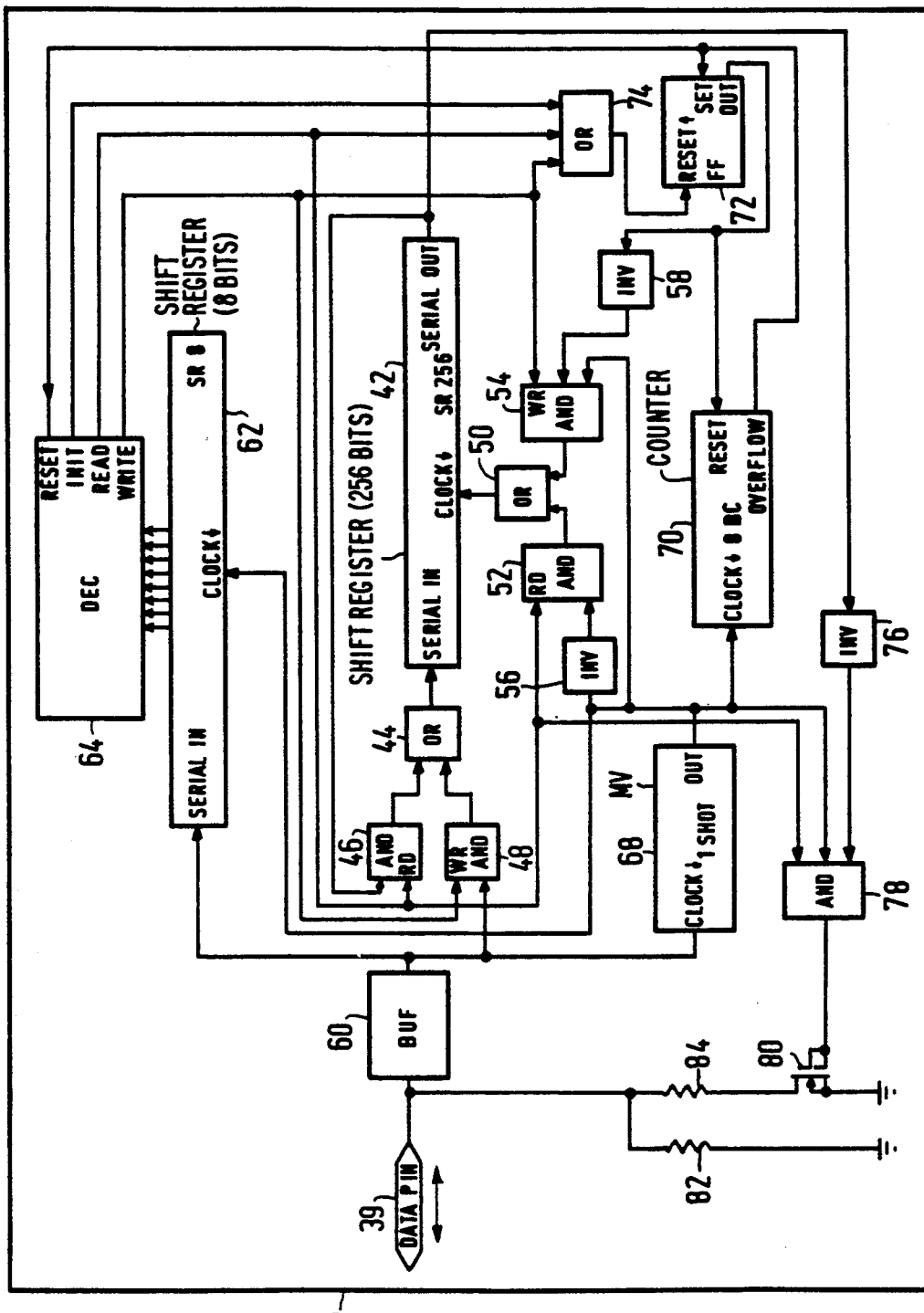
FIG. 4 shows a circuit diagram of the memory circuit in the information carrier.

FIG. 4 is a more detailed diagram of memory circuit 38. It comprises a 256-bit shift register 42 having a serial input, a serial output and a clock input which is activated by a descending edge. To the serial input of shift register 42 is connected the output of OR gate 44. One input of OR gate 44 is connected to the output of an AND gate 46, the other input of OR gate 44 being connected to the output of an AND gate 48. The serial output of shift register 42 is connected, on one side, to either of the two inputs of AND gate 46 and, on the other side, to the input of inverter 76. The clock input of shift register 42 is connected to the output of an OR gate. One input of OR gate 50 is connected to the output of AND gate 52, the other input of OR gate 50 being connected to the output of an AND gate 54.

The memory circuit 38 further includes an 8-bit shift register 62 having a serial input, a parallel output and a clock input which is activated by a descending edge. The parallel inputs of a decoding logic unit 64 are connected to the parallel outputs of shift register 62. The decoding logic unit 64 furthermore has a 1-bit reset input, a 1-bit initialization input, a 1-bit read output and a 1-bit write output.

Through data input 39 and input buffer 60 signals can be fed to the buffer circuit. Input buffer 60 is merely used for bringing the input pulses into the proper form. The output of buffer 60 is connected to the serial input of shift register 62, an input of AND gate 48 and the clock input of a one-shot multivibrator 68. This clock input is activated by a descending edge of the signal supplied thereto. This multivibrator 68 produces a pulse having a duration of about 35 µs on its output in response to a descending edge on its clock input. The output of the multivibrator 68 is connected to the clock input of shift register 62, the input of an inverter 56, the first of three inputs of AND gate 54, the clock input of counter 70 and to the second of three inputs of an AND gate 78.

The 8-bit counter 70 has an overflow output connected to the set input of a flip-flop 72 and to the reset input of decoding logic 64. The output of flip-flop 72 is connected to the reset input of counter 70 and the input of an inverter 58, whose output is connected to the second of three inputs of AND gate 54. The reset input of flip-flop 72 is connected to an output of an OR gate 74.

The write output of decoding logic unit 64 is connected to an input of AND gate 48, a third input of AND gate 54 and to a first of three inputs of OR gate 74. The read output of decoding logic unit 64 is connected to an input of AND gate 46, an input of AND gate 52 and to the first of three inputs of AND gate 78. The initialization output of decoding logic unit 64 is connected to the third input of OR gate 74.

The output of inverter 76 is connected to the third input of AND gate 78. The output of this AND gate is connected to the gate of field effect transistor 80, whose first main electrode is connected to data input 39 through a resistor 84 of, for example, 100 Ω and whose second main electrode is connected to the common reference voltage. Likewise connected to data input 39 is a resistor 82 which has a value of, for example, 500 Ω. The other side of this resistor is connected to the common reference voltage.

For explaining the operation of the memory circuit it is assumed that initially both outputs (read and write) of decoding logic unit 64 are low (logic "low" corresponds to a 0 bit value). Flip-flop 72 is of the asymmetric type, which is to say that the output is high when the supply voltage is switched on. Consequently, the 8-bit counter 70 is initially kept in the reset state.

A complete memory cycle consists of an initialization part during which the memory is brought to an initial state, followed by a command word as described with reference to FIG. 3, and then a read or write sequence of 256 bits. The initialization part consists of supplying 264 time slots for writing 0-bit values (write-zero-time slot) to the data input 39. At the first descending edge (thus at the end of time interval T1 in FIG. 2b) one-shot multivibrator 68 generates a 35 µs pulse. Due to the descending edge of this pulse the clock input of shift register 62 is activated so that a 0-bit value is written in the shift register (Counter 70 does not change its count because the reset input is high). When eight zeroes have thus been written in shift register 62, this situation is detected by the decoding logic unit 64 causing its initialization output to become high (this situation is retained until the rest input is rendered high again). The high value of the initialization output is supplied to the reset input of flip-flop 72 through OR gate 74, in response to which the output of this flip-flop becomes low. Consequently, the 8-bit counter 70 is driven out of the reset state. With the descending edge of the ninth 0-bit multivibrator 68 again produces a pulse having a duration of 35 µs. The descending edge at the end of this pulse activates the clock input of counter 70 so that this counter is incremented by unity. This process takes place 256 times after which, at the last 0-bit, the overflow output of counter 70 becomes high. As a result, the set input of flip-flop 72 becomes high and the reset input of decoding logic 64 also becomes high. The result is that the output of flip-flop 72 becomes high so that the reset input of counter 70 becomes high and the counter 70 is retained at the count of zero. Since the reset input of decoding logic 64 becomes high, the initialization output, the read output and the write output all become low. In this state the decoding logic 64 no longer reacts to any further presented zeroes. Neither does the count of counter 70 change by the presentation of 0-bits. The state of decoding logic 64 can now be changed only by the presentation of a write command or a read command.

It is now assumed that a read command is presented, thus an 80-bit sequence in which the first bit has the 1 value and all further bits have the zero value. This command word is decoded by decoding logic unit 64 so that the read output becomes high and remains in this state until the reset input becomes high again. As a result of the first descending edge in the first time slot after the command word, one-shot multivibrator 68 generates a pulse having a duration of 35 µs. The descending edge of this pulse makes the counter 70 increment by unity. The ascending edge of this pulse is inverted to a descending edge by the inverter 56. Consequently, the output of AND gate also presents a descending edge which is applied to the clock input of shift register 42 through OR gate 50. Thus, the data in the shift register 42 are shifted by one location. It is assumed that a 0-bit value, i.e. logic value "low", appears on the serial output of this shift register. This low value is inverted to a high value by the inverter 76. All three inputs of AND gate 78 are high now: the first input is connected to the read output of decoding logic 64, to the second input is applied the 35 µs pulse multivibrator 668 and the third input is connected to the output of inverter 76. Consequently, the output of AND gate 78 will be high, so that field effect transistor 80 is rendered conductive. The result is that the data input 39 is connected to the common reference voltage through the low resistor 14. As a result, the base of transistor 32 (cf. FIG. 1) is kept low, so that the resonance circuit (34, 36) is no longer short-circuited. This situation is detected by detector 14 which delivers the thus detected 0-bit to microprocessor 6.

The 0-bit clocked to the serial output of shift register 42 is also applied to AND gate 46. Consequently, the output of this AND gate becomes low, which low value is fed to the serial input of shift register 42 through OR gate 44. Thus, the data in the shift register are not lost as a result of a reading cycle.

If the bit clocked to the serial output of shift register 42 had the 1 value, an input of AND gate 78 would be kept low by means of inverter 76. The gate of transistor 80 would then also be low so that this transistor would not be conductive. This results in the fact that data input 39 is not maintained at a low value, so that the base of transistor 32 is raised and this transistor thus becomes conductive during the reading interval (during which the voltage on the junction between the cathode of zener diode 26 and resistor 28 is rendered high, cf. FIG. 1). Also with the 0-bit this situation is detected by detector 14 and passed on to microprocessor 6.

When 256 time slots have passed in this manner, the overflow output of counter 70 becomes high, so that decoding logic 64 is reset. The logic read output is rendered low again and the decoding logic now again waits for an initialization cycle or a command word.

It is now assumed that a write command word is applied to shift register 62, i.e. a sequence of 8 bits of which the first bit is a 1, the next two 0's and all further bits are 1's. After the write command word the write output of decoding logic unit 64 becomes high. (The reset and initial inputs remain low.) This high value is passed on through OR gate 74 to the reset input of flip-flop 72, so that its output becomes low and counter 70 is moved to the counting state. This low output value is likewise made high by the inverter 58 and supplied to an input of AND gate 54. The high write signal of decoding logic 64 is then applied to an input of AND gate 48 and to an input of AND gate 54.

As a result of the first descending edge in the first time slot after the command word multivibrator 68 generates a 35 μs pulse. Due to the descending edge of this pulse counter 70 is incremented by unity. This 35 μs pulse is also applied to a third input of AND gate 54 whose two other inputs are also high. Consequently, the output of AND gate 54 becomes high and this high value is transferred to the clock input of shift register 42 through OR gate 50. The descending edge of this pulse likewise forms the descending edge of the signal on this clock input so that the shift register at that moment writes the bit value present on its input. This bit value is determined by the value of the output of AND gate 48. One of the inputs of AND gate 48 is high since it is connected to the write output of decoding logic 64. The other input of AND gate 48 is connected to data input 39. If a 1-bit value is available on data input 39 at the write instant, the output of AND gate 48 will also present the value of 1 and this value will be applied to the input of shift register 42 through OR gate 44; if at that moment a 0-bit value is present on data input 39, one of the inputs of AND gate 48 will be low so that the output of this gate will also be low. This low value will then be applied to shift register 42.

When 256 write time slots have thus passed, the overflow output of counter 70 becomes high so that decoding logic 64 is reset. The write output now becomes low again and the decoding logic again waits for an initialization cycle or an instruction word.

Figure 5:
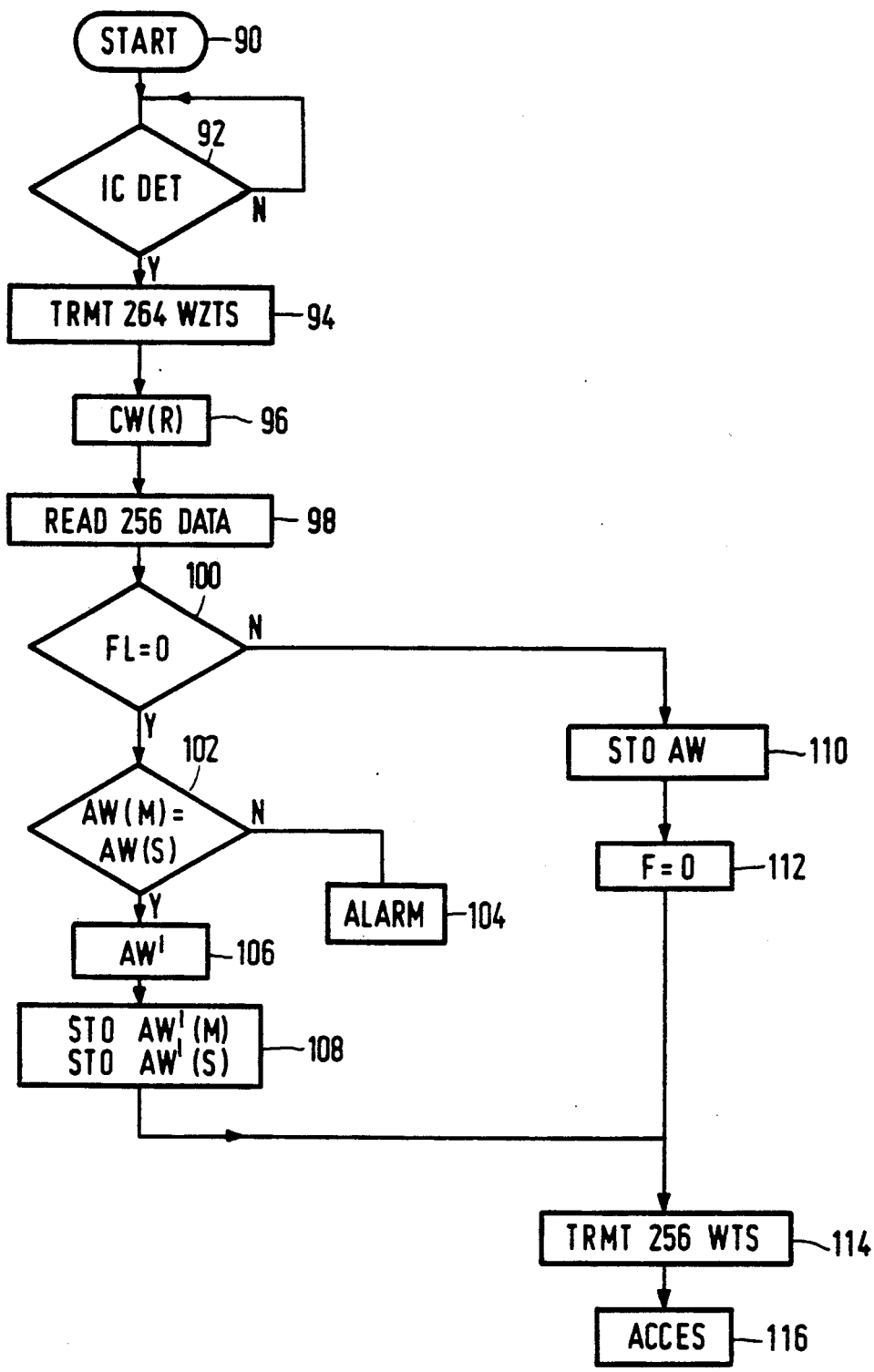
FIG. 5 shows a flow chart representing the course of the process in the read/write unit when the information carrier is used as a hotel key.

The flow chart shown in FIG. 5 illustrates the course of the process in the read/write unit when an information carrier is used as a hotel key. The blocks in this flow chart have the following connotations:

| block number | title | connotation |
| --- | --- | --- |
| 90 | START | start of the access procedure |
| 92 | IC DET | it is detected whether an information carrier is present at the read/write location |
| 94 | TRMT 264 WZTS | 264 "write-0-time slots" are transmitted to the information carrier |
| 96 | CW(R) | a read command word is transmitted to the information carrier |
| 98 | READ 256 DATA | the read/write unit reads the 256 bits stored in the shift register of the information carrier |
| 100 | FL=0 | it is detected whether a flag accompanies the logic value of said bits |
| 102 | AW(M)= AW(S) | it is detected whether the access codeword stored in a first memory field 6a of the read/write unit (see FIG. 1) matches the access code word formed by the bits read from the information carrier which code word has been stored in a second memory field 6b of the read/write unit (see FIG. 1) |
| 104 | ALARM | the read/write unit sends out an alarm signal if the codewords do not match |
| 106 | AW' | the read/write unit generates a new access codeword based on the existing access codeword |
| 108 | STO AW' (M) STO AW' (S) | the newly formed access codeword is stored both first memory field 6a of the read/write unit and in the bit sequence intended to be stored in the information carrier |
| 110 | STO AW | the access codeword read from the information carrier is stored in the second memory field 6b of the read/write unit |
| 112 | F=0 | the flag causes a complementary logic value to be produced |
| 114 | TRMT 256 WTS | the bit sequence intended for the information carrier is written therein |
| 116 | ACCESS | the read/write unit applies an access signal to the door lock. |

When the information carrier is used as a key for the door of a hotel room or bungalow in a holiday park, it (i.e. the key) is inserted into a read/write unit located outside the door. After the access cycle has been started (90) it is verified whether there is a key present at the read/write location (92). If there is, the reading of the key is initialized by the transmission of 264 write-0 time slots (94) to the key. After the memory in the key is brought to a known state in this manner, the read command word is transmitted to the key (96). Then the read/write unit transmits 256 read time slots to the key and reads the relevant bits in such time slots from the key memory (98).

In the 256 bit sequence, a number of such bits constitute the access codeword. The first time a key is inserted into a read/write unit of a room, the read/write unit uses this codeword to calculate therefrom new codewords to be used at a later stage, for example, by adding unity thereto. In order to indicate that the key has not previously been inserted into the relevant read/write unit, there is a bit F which is a flag representing this situation with a 1-bit value. The processor is thus able to verify whether the flag has the 0 value (100). If not, that means that the key has been inserted into the read/write unit for the first time. From the bit sequence of 256 bits the access codeword therein is stored in the second memory field of the read/write unit (110), after which the flag is set to 0 (112). Then the thus modified (F changed from 1 to 0) bit sequence is again written back into the key memory and access is given to the room.

If, during testing of the flag it is found to have the 0 value, the access codeword read out from the key is compared with the access codeword stored in the first memory field of the read/write unit (102). If these words do not match, an alarm signal is given (104). If they do match, a new access codeword is calculated on the basis of the access codeword already present (106). For this purpose a simple algorithm may be used, for example, adding unity to the number represented by the bit combination of the codeword. Alternatively, more intricate algorithms are possible. The newly calculated access codeword is now stored in the bit sequence intended for the key and in the first memory field of the read/write unit (108). Finally, the bit sequence containing the new access codeword is written in the key memory (114) and access is given to the room (116).

If the key were copied illegally, the illegal copy would not give access to the room any more after the original key had been used once or twice to open the room. In that case the access codeword in the read/write unit is different from that in the illegal copy.

Figure 6:
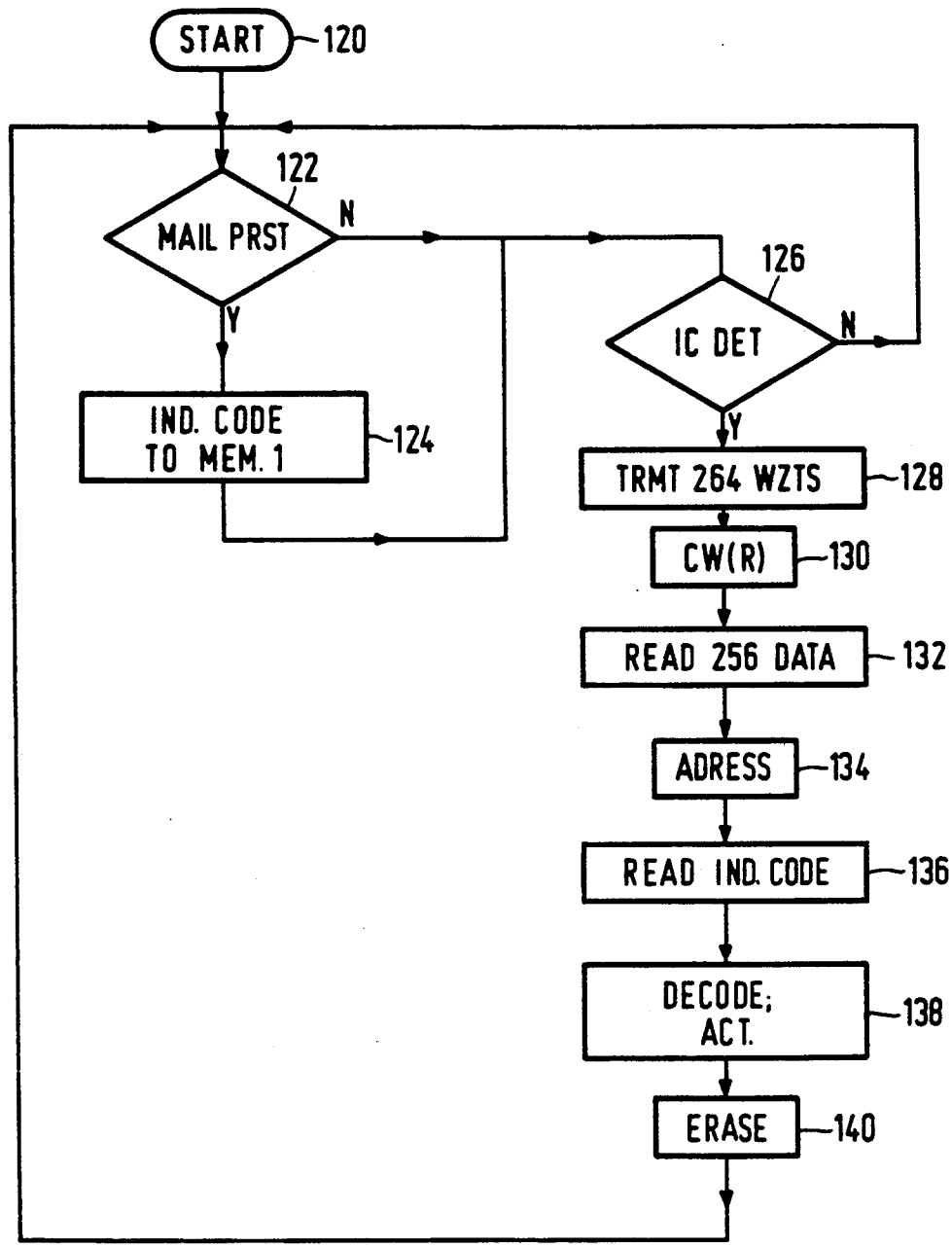
FIG. 6 shows a flow chart of the course of the process in a read/write unit when used as a mail or message indicator.

The flow chart represented in FIG. 6 illustrates the course of the process in a read/write unit used as mail/message indicator. The blocks in this flow chart have the following connotations:

| block number | title | connotation |
| --- | --- | --- |
| 120 | START | start of the mail indication procedure |
| 122 | MAIL PRST | the read/write unit detects whether a mail indication message is presented at the additional data input |
| 124 | IND. CODE TO MEM 1 | the indication code is stored in the first memory field 6a of microprocessor 6 (see FIG. 1) at the address therein corresponding to the room number |
| 126 | IC DET | it is detected whether an information carrier is present at the read/write location |
| 128 | TRMT 264 WZTS | the read/write unit transmits 264 "write-0 time slots" to the information carrier |
| 130 | CW(R) | a read command word is sent to the information carrier |
| 132 | READ 256 DATA | the read/write unit reads the sequence of 256 bits from the shift register of the information carrier |
| 134 | ADDRESS | the read/write unit selects the address in the first memory field 6a corresponding to the room number signified by the sequence of 256 bits |
| 136 | READ IND. CODE | the read/write unit reads the contents of the first memory field 6a at the selected address |
| 138 | DECODE; ACT. | the read/write unit decodes the read-out indication code and activates an indicator which signifies the result |
| 140 | ERASE | the indication code is erased from the memory location involved. |

If the read/write unit has an additional data input the unit may be used as a mail/message indicator, for example, in a hotel or holiday park. Through the additional data input there may be stored in the memory of the read/write unit for each room whether there is any mail message. The memory in the information carrier thereto has a unique identification code, for example, the room number. If there is any mail for that specific room, this will be notified by storing an indication code in the first memory field 6a of the read/write unit (122 or 124) at an address therein matching the room identification code. When a hotel guest returns to the hotel, he places his information carrier (the room key) the read/write unit and it is read out (126).

the reading of the key is initialized by sending 264 write-0 time slots to the key (128). Once the memory in the key has thus been set to a known state in the command word for reading is sent to the key (130). The read/write unit then sends 256 read time slots to the key and reads from each time slot the relevant bit from the key memory (132).

After the 256-bit bit sequence from the information carrier has been read out, the read/write unit selects the identification code (134) included in such sequence. This identification code signifies the address of a corresponding location in the first memory field, which has therein a message indication code. Such indication code is read out and decoded. The decoding may signify that there is no message at all. In that case a light is activated which denotes "no message". However, if the decoding signifies that a telefax message has arrived, a different light is activated denoting telefax message. After has thus been informed of his message, the indication code is erased and the process returns to the starting point.

I claim:
1. A system for providing verified exchange of data between an electronic information carrier and a read/write unit for reading/writing data in the information carrier, comprising:
   first transmitting means comprising a send section in the read/write unit and a receive section in the information carrier;
   second transmitting means comprising a send section in the information carrier and a receive section in the read/write unit;
   detecting means comprised in the receive section of the second transmitting means and which is adapted to (i) produce a detection signal when the information carrier is at a read/write location with respect to the read/write unit, and (ii) produce a data signal in response to reception of a data signal by the receive section of the second transmitting means;

a memory unit comprised in the information carrier and having a common input/output which is interconnected to both an input of the receive section in the information carrier and an input of the send section in the information carrier; and data processing means included in or coupled to the read/write unit having an input for receiving detection signals and data signals from the detection means and an output for supplying data signals to the send section of the first transmitting means, said data processing means being adapted to (i) actuate the send section of the first transmitting means in response to reception of a detection signal from said detecting means, and (ii) receive data signals from said detecting means and by comparison determine whether they match the data signals then being supplied by said data processing means to the send section of the first transmitting means.

2. A system as claimed in claim 1, wherein the send section and the receive section of the first transmitting means comprise respective induction coils which become inductively coupled when the information carrier is placed at said read/write location with respect to the read/write unit.

3. A system as claimed in claim 2, wherein the send section and the receive section of the second transmitting means comprise respective induction coils which become inductively coupled when the information carrier is placed at said read/write location with respect to the read/write unit.

4. A system as claimed in claim 3, wherein the induction coil of the send section of the second transmitting means is comprised in a resonant circuit.

5. A system as claimed in claim 4, wherein the detection means comprises: an oscillator for producing an output signal having a frequency corresponding to a resonant frequency of said resonant circuit, and means coupled to the oscillator for detecting the amplitude of said output signal thereof.

6. A system as claimed in claim 1, wherein the read/write unit is a peripheral unit which is one of a plurality of substantially identical peripheral units, and said data processing means is comprised in a central unit which includes a plurality of gates, each gate coupling said data processing means to a respective one of said peripheral units.

7. A system as claimed in claim 1, wherein said data processing means has a memory field for storing a first codeword, a second codeword is stored in the memory included in the information carrier, and the second codeword is transmitted to said data processing means when the information carrier is placed in said read/write position; said data processing means being adapted to (i) compare the first and second codewords and generate a match signal if they match, and (ii) generate a new codeword for storage in said memory field thereof in place of the first codeword and which is also transmitted via said first transmitting means to the memory in said information carrier for storage therein in place of the second codeword.

8. A system as claimed in claim 1, wherein the memory in the information carrier has a unique identification code stored therein and said data processing means comprises:

a first memory field;

an additional data input coupled to the first memory field for receiving identification codes as well as an indication code identifying a particular kind of auxiliary information relating to each of the identification codes; and a second memory field for storing the identification code read out from the information carrier;

said data processing means being adapted to compare the identification codes in the first and second memory fields and to decode the indication code when the two identification codes match, the decoding of the indication code including activating an indicator identifying the kind of auxiliary information to which the indication code relates.

9. An read/write (R/W) unit for use in an information exchange system wherein the R/W unit receives/writes data in a data store which is included in an information carrier, the system providing verification of the exchange of data between the R/W unit and the information carrier; said R/W unit comprising:

a send section for transmitting data to the information carrier for storage in said data store;

a receive section for receiving data transmitted by the information carrier from the data store, the receive section being further adapted to produce a detection signal when the information carrier is present at a read/write location with respect to the R/W unit;

data processing means having a data input coupled to said receive section to receive said detection signal therefrom and also data received by said receive section from the information carrier, and having a data output coupled to said send section to supply data thereto;

said data processing means being adapted to (i) actuate said send section in response to reception of a detection signal from said receive section, and (ii) determine by comparison whether the data signals being received at said data input from said receive section match the data signals being supplied from said data output to said send section.

10. An information carrier for use in an information exchange system which includes a read/write (R/W) unit for receiving data from and transmitting data to the information carrier, the R/W unit comprising or being coupled to data processing means for verifying exchange of data between the R/W unit and the information carrier; said information carrier comprising:

a receive section for receiving data transmitted by the R/W unit;

a send section for transmitting data to the R/W unit; and a data store having a common input/output which is interconnected to both an output of said receive section and an input of said send section, said data store being adapted to store therein data supplied to said common input/output from the receive section and to produce the stored data at said common input/output for transmission by said send section to the R/W unit;

whereby by comparison of data received by the R/W unit from said store with data transmitted by said R/W unit and stored in said data store, said data processing means can verify whether the transmitted and received data are in agreement.

* * * * *